United States Patent [19]

Podrapsky et al.

[11] 4,188,929
[45] Feb. 19, 1980

[54] INTERNAL COMBUSTION ENGINE MAGNETO-TYPE IGNITION SYSTEM WITH ELECTRONICALLY CONTROLLED SPARK ADVANCE

[75] Inventors: Jiri Podrapsky, Buchschwabach; Josef Orova, Schwabach, both of Fed. Rep. of Germany

[73] Assignee: Robert Bosch GmbH, Stuttgart, Fed. Rep. of Germany

[21] Appl. No.: 823,832

[22] Filed: Aug. 11, 1977

[30] Foreign Application Priority Data

Aug. 17, 1976 [DE] Fed. Rep. of Germany ....... 2636945

[51] Int. Cl.² .................. F02P 3/06; H05B 37/02
[52] U.S. Cl. ................... 123/148 E; 123/146.5 A; 123/148 CC; 315/209 T
[58] Field of Search ..... 123/148 E, 148 CC, 146.5 A; 315/209 T, 209 R, 209 CD

[56] References Cited

U.S. PATENT DOCUMENTS

| | | | |
|---|---|---|---|
| Re. 29,374 | 8/1977 | Just et al. | 123/148 CC |
| 3,587,552 | 6/1971 | Varaut | 123/148 E |
| 3,605,713 | 9/1971 | Masters et al. | 123/148 E |
| 3,704,700 | 12/1972 | Wesemeyer | 123/148 CC |
| 3,745,985 | 7/1973 | Höhne | 123/148 E |
| 3,791,364 | 2/1974 | Saita | 123/146.5 A |
| 3,828,754 | 8/1974 | Carlsson | 123/148 CC |
| 3,855,985 | 12/1974 | Shirai | 123/148 CC |
| 3,963,015 | 6/1976 | Haubner et al. | 123/148 CC |
| 4,064,415 | 12/1977 | Blackington | 315/209 T |

FOREIGN PATENT DOCUMENTS

2338564 2/1975 Fed. Rep. of Germany ....... 123/148 E

Primary Examiner—Charles J. Myhre
Assistant Examiner—P. S. Lall
Attorney, Agent, or Firm—Frishauf, Holtz, Goodman, Woodward

[57] ABSTRACT

To provide for electronically controlled spark advance of the ignition instant in a transistorized magneto ignition system, the ignition instant is controlled by a threshold switch responsive to voltage generated by the magneto, the threshold being connected to a timing circuit which includes a resistance network therein, the resistance value of which is variable with respect to operating speed of the engine. The resistance network includes a R/C timing circuit which, as the speed of the engine increases, presents a respectively smaller resistance value to rapidly recurring signals from the magneto so that, effectively, the resistance value of the timing circuit controlling current flow through the threshold circuit is decreased, causing a shift in the ignition instant, the circuit being arranged to advance the spark with respect to upper dead center (UDC) position of the piston of the engine.

16 Claims, 3 Drawing Figures

INTERNAL COMBUSTION ENGINE MAGNETO-TYPE IGNITION SYSTEM WITH ELECTRONICALLY CONTROLLED SPARK ADVANCE

The present invention relates to a magneto-type ignition system for internal combustion engines, and more particularly to such an ignition system which is especially adapted to a use with one-cylinder engines in which the ignition timing can be changed electronically with change in engine speed.

BACKGROUND AND PRIOR ART

It has previously been proposed to provide magneto-type ignition systems by utilizing a switching semiconductor, such as a transistor which is controlled first to conduction to store magnetic energy in an ignition coil and then to cut off, or blocked state, the abrupt transition of the transistor causing an inductive pulse in the secondary, which causes breakdown of the spark gap of a spark plug, thereby causing an ignition event. The system is so arranged, that at the beginning of positive voltage half wave in the primary circuit, the ignition transistor is first controlled to conductive state to cause primary current to flow. The armature of the magneto generator will, accordingly, store electric energy due to a strong magnetic field occurring in the magneto. In the range of the peak value of the voltage half wave, the switching transistor is controlled to cut off, causing the ignition event.

It is desirable to change the timing of the ignition event with respect to upper dead center (UDC) position of the piston of the internal combustion engine. Timing, and typically spark advance has previously been controlled by the magneto itself. The magneto was constructed to generate first a smaller and thereafter a larger positive voltage half wave in the primary circuit. At low engine speeds of the internal combustion (IC) engine, a threshold switch which forms part of the circuit would be triggered to initiate the ignition event only when the voltage half wave has reached a certain value, which could only occur at the higher or second voltage half wave. Since, with increasing speed, the voltages in the primary circuit also increase, the threshold switch would respond in an upper speed range already when the smaller voltage half wave occurs, which occurs earlier than the larger one. Thus, the ignition event is advanced, that is, ignition is advanced with respect to UDC position of the piston The advance occurs at a predetermined speed, that is, when the smaller half wave reaches the threshold level of the threshold switch. The transition between timing of the ignition event by the main wave and by the auxiliary high speed control wave is sudden and abrupt. This system is described in detail in U.S. Pat. No. 3,963,015, Haubner et al, assigned to the assignee of this application.

The efficiency of IC engines, which operate at wide range of speeds depends to a substantial extent on ignition timing. In intermediate speed ranges, therefore, an intermediate ignition advance is desired and operating with respect to two discrete timing positions is undesirable. The ignition advance-engine characteristic is not matched efficiently to the load requirements and operating conditions of the engine. Generations of an additional auxiliary triggering wave to advance ignition timing causes additional expense due to additional constructional elements of the magneto itself.

SUBJECT MATTER OF THE PRESENT INVENTION

It is an object to provide an ignition advance system in a magneto-controlled IC engine, which is simple, uses a minimum of components and which reliably advances ignition over a wide range of speed, smoothly and without abrupt transitions, and which permits matching of ignition advance to engine operating characteristics.

Briefly, the primary ignition circuit is connected to a control switch, typically a transistor, which becomes conductive to store magnetic energy in the primary coil upon occurrence of a positive half wave from the magneto. At an ignition instant, controlled by a control circuit, the transistor blocks to cause an inductive voltage to occur at the secondary, and breakdown of the spark gap of the spark plug. The control circuit includes a threshold circuit responsive to a predetermined voltage level. When the voltage has reached the predetermined level, it causes a control signal to be generated which controls the main switch to change from conductive to block state. In accordance with the invention, a main timing circuit is connected to the threshold circuit which timing circuit includes an impedance, changing impedance value as a function of speed. This impedance, in accordance with a feature of the invention, is a resistance network which includes a second timing circuit. The timing circuits are R/C networks. To modify the resistance value of the main timing circuit, a second R/C timing circuit is connected in parallel to the resistor thereof. As the speed of the engine increases, the effective resistance of the R/C parallel connected timing circuits will decrease, due to the higher frequency of occurrence of signals from the magneto, thus lowering the effective resistance value thereof, which, in turn, causes a change in response of the threshold circuit and hence a change in timing of the cutoff control signal from the threshold circuit to the main ignition switch, formed by the main transistor.

Control of the main ignition transistor by means of a threshold switch to which two timing circuits or timing networks are connected permits ready matching of the engine characteristics to ignition advance, by suitable dimensioning of the components of the R/C networks, so that the desired ignition advance-speed curve can be obtained.

The characteristic curve of ignition advance versus speed can be obtained by using a Zener diode as part of the threshold switch, and locating the Zener diode between the capacitor and the resistor of the first, or main R/C timing network. This permits connection of the second timing network across the resistor component of the first timing network only, and ready modification of the response characteristics of the overall network with respect to speed.

Drawings, illustrating an example:

Figure 3:
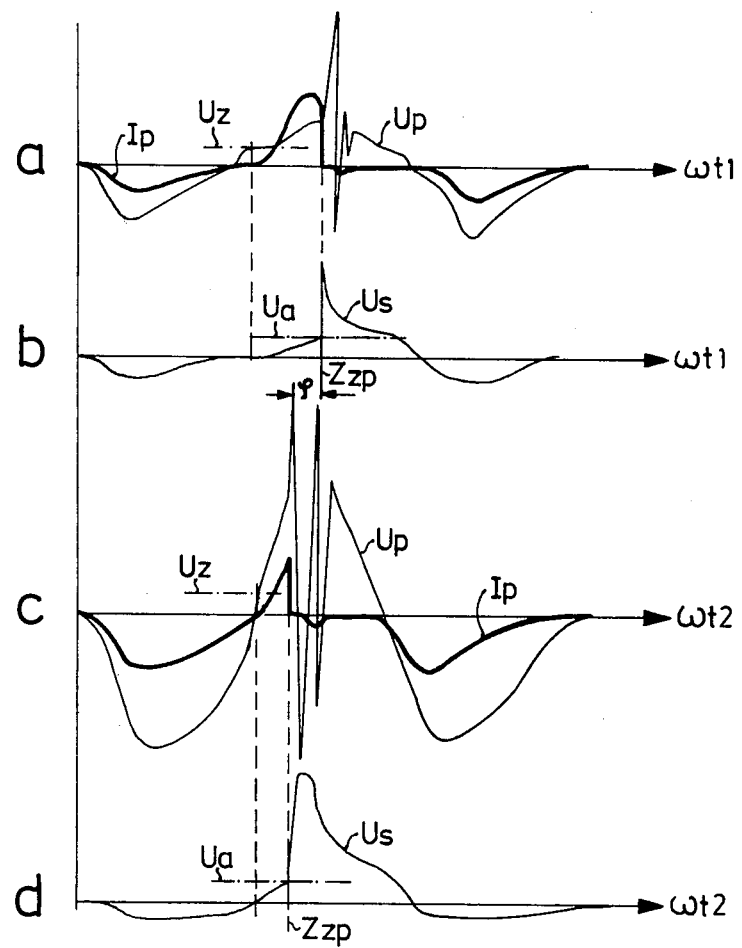

And FIG. 3, in four superimposed graphs a–d shows the primary and secondary control voltages in lower regions of speed (graphs a and b) and higher regions of speed (graphs c and d).

Figure 1:
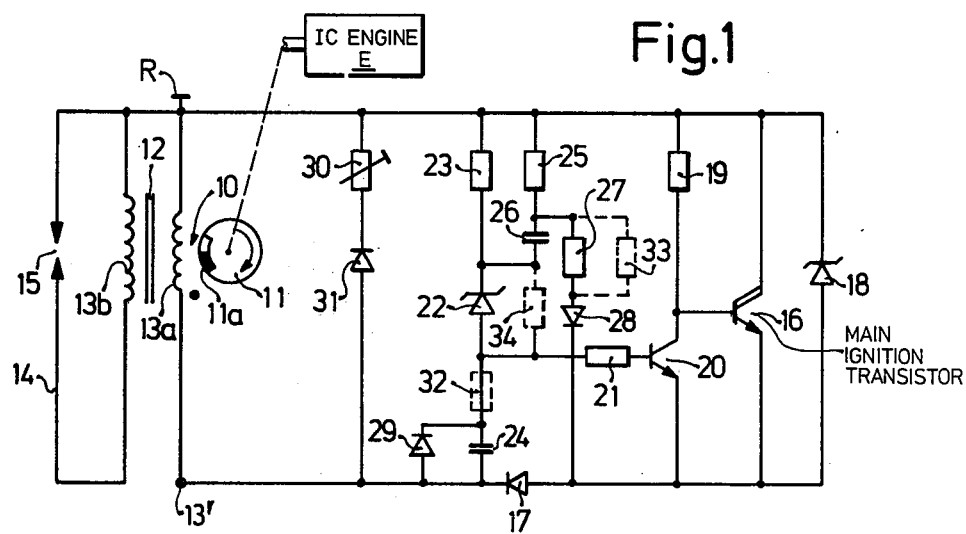
FIG. 1 is a schematic circuit diagram of a magneto system coupled to an IC engine.

FIG. 1 illustrates an ignition system for a one-cylinder IC engine. Ignition is supplied by a magneto 10 which has a rotating magnetic system or core 11 with two pole shoes and a permanent magnet 11, located at the outer circumference of a flywheel, fan, blower or other rotating element of the internal combustion engine shown generally only as E. The magnetic system 11 cooperates with an armature 12 located in the housing of the IC engine. The armature simultaneously functions as the ignition coil and includes a primary winding 13a and a secondary winding 13b. The secondary winding 13b has its active or "high" terminal connected through an ignition cable 14 with a spark plug 15. The other side of the secondary 13b and the spark plug is connected to chassis of the engine, that is, to the frame thereof, forming a point of reference potential indicated as R. The terminal of the primary 13a not connected to the reference R is shown as 13'.

The primary circuit of the primary winding 13a of the armature 12 includes a npn main ignition transistor 16. This transistor is constructed as a Darlington switching transistor, having its collector connected to chassis or reference R, and its emitter connected through a diode 17 to terminal 13' of the primary. The diode 17 is provided as protection against reverse current, and is poled in the same current carrying direction as the current flow through transistor 16. A Zener diode 18 is connected across ignition transistor 16 to protect the transistor against high voltages. The base of the ignition transistor 16 is connected to the collector through a resistor 19. The control path formed by the base-emitter junction of transistor 16 is connected to a control circuit which includes a npn control transistor 20, having its emitter-collector path connected in parallel to the base-emitter junctions of the Darlington main transistor 16. The base of the control transistor 20 is connected to a command circuit through a resistor 21. The command circuit is connected in parallel to a primary 13a and includes a Zener diode 22, forming a threshold element of a threshold switch.

In accordance with the present invention, the command circuit includes two timing elements, or timing networks to shift the ignition instant in dependence on engine speed. The first timing network is formed by a series R/C circuit having a resistor 23 and a capacitor 24. The Zener diode 22 is connected between the resistor 23 and the capacitor 24 of the first timing network, by having its anode connected to the capacitor 24 and its cathode to the resistor 23. The other terminal of resistor 23 is connected to reference R; the other terminal of capacitor 24 is connected to terminal 13'.

The second timing network is connected in parallel to the resistor 23 of the first timing network, and includes a series R/C circuit, formed by resistor 25 and capacitor 26. A further circuit is connected between the resistor 25 and capacitor 26 of the second timing network, connected to the terminal of the primary winding 13a of the magneto armature 12, to which also one connection of capacitor 24 is connected, that is, to terminal 13', although the connection is through diode 17. This additional circuit includes a resistor 27 and a series connected diode 28. The diode 17 likewise is included in this circuit. The capacitor 24 of the first timing circuit is shunted by a diode 29, connected to terminal 13' of the primary armature winding 13a. The primary 13a has connected there across the series circuit of a resistor 30 and a diode 31. Diode 31 is so poled that in the ignition circuit, it blocks primary current flow. This network is used to dampen or attenuate the voltage half waves derived from the magneto 10 which are not required for ignition. Attenuation of these voltage half waves can be obtained by suitable adjustment or dimensioning of the resistor 30, or by choice of one or more resistors in lieu of a single adjustable resistor, as shown.

Figure 2:
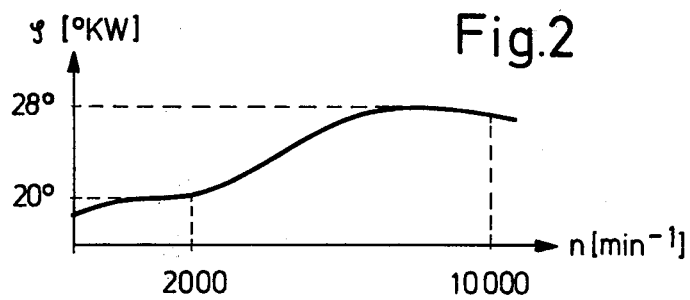
FIG. 2 is the speed-ignition angle advance curve of a typical IC engine.

Operation, with reference to FIG. 2 and 3: The desired ignition timing-speed characteristics over the entire design speed range of the IC engine is shown in FIG. 2; upon idling, ignition is preferably advanced; with respect to exhaust pollution laws and other considerations, including stable idling, a suitable ignition event timing angle is 20° in advance of UDC position of the piston, that is, the ignition advance angle is +20°. As the speed increases, ignition should be advanced in order to improve the efficiency of the engine. The ignition advance should be smooth and continuous. At the upper speed range, maximum ignition advance of about +28° of crankshaft rotation with respect to UDC is suitable as shown in FIG. 2.

The network of FIG. 1 provides an ignition advance curve similar to FIG. 2.

Primary current Ip is shown in FIG. 3, graph a for a low speed range of the engine. The time axes $\omega t_1$, for low speed operation, correspond to about 1/1000 minutes; the time axes $\omega t_2$ correspond to about 1/8000 minutes. The voltages in FIG. 3 are shown with respect to reference or chassis terminal R.

Upon starting of the engine, the magneto system 11 is rotated in the direction of the arrow (FIG. 1) and as the magnet 11a passes the E-shaped core of the ignition armature 12, voltages will be induced in the winding 13a, 13b. These voltages will at first have a negative half wave, then a positive half wave and, thereafter, again a negative half wave. The two negative half waves are attenuated by the network formed by resistor 30 and diode 31. The capacitor 24 is bridged by the diode 29, which is so poled that it passes negative half waves, so that it is charged only to the intrinsic voltage of diode 29. The two transistors 16 and 20 are blocked. As soon as the positive voltage half wave of the primary voltage Up occurs, it is applied through a resistor 19 to the base of the ignition transistor 16 and causes transistor 16 to become conductive. Primary current Ip can then flow through the continuous switching path of ignition transistor 16 and the primary coil 13a. When the primary voltage Up reaches the threshold level Uz, of Zener diode 22 of about 4 V, the Zener diode 22 becomes conductive and control current will flow over resistors 23 and 25, charging capacitors 24 and, 26. A portion of the control current flowing through resistor 25 is bypassed through resistor 27 and diode 28. At ignition instant Zzp, the control voltage Us at the base of transistor 20, see FIG. 3 graph b, will reach the response level Ua of the control transistor 20. The base of the control transistor 20 is connected to the capacitor 24 through the resistor 21. At that instant, control transistor 20 is rendered conductive, and its main switching path i.e., the emitter-collector path will now short circuit the control path i.e. the base-emitter junction of the ignition transistor 16, which will block instantaneously. The primary current Ip is abruptly interrupted, inducing in the primary winding 13a, as well as in the secondary 13b voltage pulses. The voltage in the secondary 13b will cause an ignition spark at the spark plug 15. The resistor 21 delays the discharge of the capacitor 24 connected to the base of the transistor 20. Further, the voltage pulse of the primary winding 13a is applied through the Zener diode 22 to the base of the control transistor 20. This application of energy to the control transistor ensures that the control transistor 20 will remain conductive and the ignition transistor 16 will remain reliably blocked during the entire occurrence of the ignition event, since its control path continues to be shunted by the now conductive switching path of the control transistor 20. The Zener diodes 18 limits the voltage pulse from the primary of the magneto coil 13a to about 300 V.

The voltage half waves of the primary voltage Up are substantially higher at the speed of 8000 rpm than at 1000 rpm—as can be readily seen by comparing graphs a and c of FIG. 3. As a consequence, the primary current Ip also increases during the negative half wave. The control voltage Us across capacitor 24 remains the same during the negative half waves throughout the entire speed range, since it is determined by the threshold voltage of diode 29. The ignition advance is obtained, in accordance with a feature of the present invention, by the positive voltage half waves of the primary voltage Up. It is this voltage which controls change of the timing of the ignition event in accordance with the characteristic curve of FIG. 2.

Adjustment, or advance of ignition of timing is obtained by changing the relative reflected impedance of the timing networks and specifically by changing the resistance of the resistive components of the R/C networks. The second R/C network, which is connected in parallel to the resistor 23, in effect, decreases the effective resistance value of the resistance connected to the capacitor 24 of the first timing circuit. Thus, as the effective overall resistance of the R/C network 23, 24 decreases, with increasing speed, the capacitor 24 will be charged more rapidly when the Zener voltage Uz of Zener diode 22 causes breakdown, or conduction of Zener diode 22. Due to the more rapid charging of capacitor 24, with increasing speed, upon earlier breakdown of Zener diode 22, the response voltage Ua of the control transistor 20 will be reached at an earlier time. This causes blocking of the main switching path of the ignition transistor 16 at earlier instant of time, and thus an advance of the timing angle of the ignition event, and hence advance of the ignition instant Zzp.

The characteristic curve of the ignition timing change can be controlled by suitable dimensioning of the elements of the networks. The voltage across capacitor 26 of the second R/C network is reduced by the resistor 27 which, together with resistor 25, forms a voltage divider. The division ratio of the voltage divider formed by resistor 25 and 27 is about 5:1.

The slope of the ignition timing curve is controlled by dimensioning of the capacitors 24, 26 and of resistors 23, 25, 27. In a typical example, capacitor 24 has a capacity of 0.68 Micro F; capacitor 26 of 0.33 Micro F. The resistance of resistor 23 was 1.2 kilo Ohms, that of resistor 25 was 820 Ohms.

Control of the control transistor 20 during the ignition event can be improved by introducing an additional resistor 32 of about 150 Ohms, (as indicated in broken lines in FIG. 1 since this resistor is not absolutely necessary), connected in series with the capacitor 24. A voltage drop will occur across resistor 32 by the induction voltage, upon occurrence of an ignition event, the voltage drop holding the control transistor 20 reliably in conductive state.

The various components have non-linear temperature characteristics; for temperature compensation, a NTC (negative temperature coefficient) resistor 33 of about 1 kilo Ohm at room temperature is connected in parallel to resistor 27 of the second timing circuit, as shown in broken lines in FIG. 1 since this is not an absolutely necessary element for functioning of an operative circuit, although desirable in actual environments.

An additional resistor 34, not strictly necessary, is preferably connected in parallel to the Zener diode 22. Use of such a resistor decreases the speed necessary at which ignition can be reliably obtained. At idling speed, it insures sufficient charge on the capacitor 24 for reliable control of the transistor 20.

Various changes and modifications may be made within the scope of the inventive concept.

We claim:

1. Internal combustion engine ignition system having
   a magneto generator (10) having a driven magnetic pole system (11);
   a primary ignition coil (13a) in flux linking relation to the magnetic system;
   a secondary coil (13b) inductively coupled to the primary coil (13a) and a spark gap (15) connected to the secondary coil;
   a semiconductor controlled switch (16) in the primary circuit of the primary ignition coil (13a);
   a control circuit connected to and controlling said controlled switch (16) to become conductive and store magnetic energy in the primary coil and to open at an ignition instant to cause an inductive voltage to arise at the secondary for generation of a spark at the spark gap to cause an ignition event in the internal combustion engine;
   said control circuit including
   a threshold circuit (23, 22, 24, 29) connected in the primary circuit and responsive to a predetermined voltage level therein and, when said voltage level is reached, providing a conduction control signal to the controlled switch (16),
   and comprising, in accordance with the invention,
   means to continuously vary the occurrence of the ignition instant (Zzp) as a function of speed of the internal combustion engine (E) including
   a main timing circuit (23, 24) having a timing capacitor (24) connected in circuit with the threshold circuit (23, 22, 24, 29), said main timing circuit including impedance means having a variable and controllable impedance value;
   circuit means coupled to the magneto generator and the impedance means to control the impedance value of said impedance means as a function of engine speed;
   and a semiconductor switch (20) connected to control conduction of said controlled switch (16) and having its control path connected to said timing capacitor and thereby its conduction controlled by the voltage across said timing capacitor (24).

2. System according to claim 1 wherein said variable impedance means comprises a fixed value impedance element and the circuit means comprises a frequency responsive network connected to and modifying the impedance value of said impedance element the frequency responsive network varying its impedance with respect to impressed voltages as the frequency of the impressed voltages change, the frequency of said impressed voltage being determined and controlled by the speed of the engine.

3. System according to claim 2 wherein the impedance element comprises a resistor (23) and the frequency responsive network comprises a timing circuit (25, 26) connected in parallel to said resistor (23).

4. System according to claim 2 wherein the main timing circuit comprises a resistance/capacitance network (23, 24), and the variable impedance comprises a resistor (23) forming the resistance of said resistance/capacitance network, and a second resistance/capacitance network (25, 26) forming a timing circuit connected in parallel with said resistor (23).

5. System according to claim 2 wherein the threshold circuit comprises a Zener diode (22), the main timing circuit (22, 23) comprises a resistor/capacitor (R/C) network (23, 24), the resistor (23) being connected to one terminal of the Zener diode and the capacitor being connected to the other terminal of the Zener diode, whereby the Zener diode will be connected between the resistance and capacitance elements of the R/C network.

6. System according to claim 5 further comprising a diode (29) bridging the capacitor (24) and shunting the capacitor of the main timing network to charge the capacitor only with voltages of one polarity derived from the primary coil (13a).

7. System according to claim 5 further comprising a resistor (34) connected in parallel to the Zener diode (22) to provide a bypass path, under low speed operation of the engine, and upon starting thereof.

8. System according to claim 2 wherein the main timing circuit comprises a resistor/capacitor (R/C) network comprising a resistor (23) and a capacitor (24), and a second timing circuit comprising a series connected resistor/capacitor (R/C) network (25, 26) is connected in parallel to the resistor (23) of the main timing circuit, the second timing circuit modifying the effective resistance value of said resistor (23) as a function of speed.

9. System according to claim 8 further comprising an additional branch circuit including a resistor (27) and at least one diode (28) serially connected thereto and connected between the resistor (25) and the capacitor (26) of the second timing network, the resistor (27) of the additional branch circuit forming a voltage divider in combination with the resistor (25) of the second timing circuit, the additional branch circuit being connected across the primary winding coil, the voltage divider circuit being connected in parallel to the winding (13a) of the magneto generator.

10. System according to claim 9 further comprising a temperature responsive resistor (33) connected in parallel to the resistor (27) forming a resistor (25) which is part of the second timing network (25, 26).

11. System according to claim 1 wherein the controlled semiconductor switch (16) in the primary circuit is a Darlington transistor;
   the semiconductor switch (20) being connected across the control path, or control circuit of said semiconductor controlled Darlington transistor (16);
   and wherein the timing circuit (23, 24) comprises a capacitor/resistor network including said timing capacitor (24), the capacitor (24) being connected in parallel with the control terminal of said semiconductor switch (20).

12. System according to claim 11 further comprising a dropping resistor (32) connected in series with the capacitor (24) of the main timing circuit, the dropping resistor-capacitor circuit being connected in parallel to the control path of the semiconductor switch (20).

13. System according to claim 11 wherein the threshold circuit includes a Zener diode 22;
   and wherein the semiconductor switch (20) comprises a control transistor (20) said control transistor having its base connected by a coupling resistor (21) to one terminal of the Zener diode (22);
   said Zener diode being connected between a resistor and a capacitor of said main timing circuit (23, 24).

14. System according to claim 11 further comprising a diode (17) connecting the emitter of the Darlington transistor (16) and of the emitter of the semiconductor switch (20) to the primary ignition coil (13a) of the magneto generator (10).

15. System according to claim 1 further including a resistor (34) connected in parallel to the thresholds circuit (22) to provide a bypass path at low operating speeds of the internal combustion engine.

16. System according to claim 1, wherein the impedance means having the variable and controllable impedance value comprises a fixed-value resistor (23) and a frequency responsive resistance/capacitance network (25, 26) forming a timing circuit connected in parallel to said resistor (23) and forming at least part of said circuit means.

* * * * *